United States Patent
Hinker et al.

(10) Patent No.: US 7,035,989 B1
(45) Date of Patent: Apr. 25, 2006

(54) ADAPTIVE MEMORY ALLOCATION

(75) Inventors: Paul Hinker, Longmont, CO (US);
Bradley Lewis, Broomfield, CO (US);
Michael Boucher, Lafayette, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/504,876

(22) Filed: Feb. 16, 2000

(51) Int. Cl.
*G06F 12/02* (2006.01)

(52) U.S. Cl. .................................... 711/171
(58) Field of Classification Search ........ 711/170–171, 711/154; 707/3, 7
See application file for complete search history.

(56) References Cited

U.S. PATENT DOCUMENTS

| | | | |
|---|---|---|---|
| 4,675,832 A | 6/1987 | Robinson et al. ........... 345/441 |
| 4,685,082 A | 8/1987 | Cheung et al. ............... 365/49 |
| 4,812,996 A | 3/1989 | Stubbs ....................... 702/123 |
| 5,073,851 A | 12/1991 | Masterson et al. .......... 711/140 |
| 5,075,847 A | 12/1991 | Fromme ..................... 717/136 |
| 5,079,707 A | 1/1992 | Bird et al. .................... 701/35 |
| 5,119,465 A | 6/1992 | Jack et al. ................... 717/137 |
| 5,146,593 A | 9/1992 | Brandle et al. ............. 709/328 |
| 5,168,563 A | 12/1992 | Shenoy et al. |
| 5,179,702 A | 1/1993 | Spix et al. .................. 709/102 |
| 5,274,813 A | 12/1993 | Itoh .......................... 717/127 |
| 5,274,821 A | 12/1993 | Rouquie |
| 5,297,274 A | 3/1994 | Jackson ....................... 703/22 |
| 5,301,312 A | 4/1994 | Christopher, Jr. et al. .... 714/32 |
| 5,325,499 A | 6/1994 | Kummer et al. ............ 711/143 |
| 5,325,533 A | 6/1994 | McInerney et al. ......... 717/107 |
| 5,353,401 A | 10/1994 | Iizawa et al. ............... 345/763 |
| 5,390,314 A | 2/1995 | Swanson .................... 717/138 |
| 5,438,659 A | 8/1995 | Notess et al. ............... 715/505 |
| 5,450,542 A | 9/1995 | Lehman et al. |
| 5,485,619 A | 1/1996 | Lai et al. .................... 717/250 |
| 5,497,458 A | 3/1996 | Finch et al. |
| 5,499,349 A | 3/1996 | Nikhil et al. ................ 712/26 |
| 5,500,881 A | 3/1996 | Levin et al. ................ 717/141 |
| 5,519,866 A | 5/1996 | Lawrence et al. .......... 717/162 |
| 5,530,816 A | 6/1996 | Holt .......................... 712/217 |
| 5,535,364 A | 7/1996 | Resman et al. |
| 5,535,393 A | 7/1996 | Reeve et al. |
| 5,539,907 A | 7/1996 | Srivastava et al. |
| 5,553,235 A | 9/1996 | Chen et al. ................... 714/20 |
| 5,574,922 A | 11/1996 | James |
| 5,613,063 A | 3/1997 | Eustace et al. ............... 714/38 |
| 5,636,374 A | 6/1997 | Rodgers et al. ............. 712/230 |

(Continued)

FOREIGN PATENT DOCUMENTS

DE       199 34 515 A1      1/2000

(Continued)

OTHER PUBLICATIONS

IBM Technical Disclosure Bulletin, "Caching Objects in a data Space," Oct. 1, 1994, vol. 37, 587-590.*

(Continued)

*Primary Examiner*—Denise Tran
(74) *Attorney, Agent, or Firm*—Finnegan, Henderson, Farabow, Garrett & Dunner, LLP (57) ABSTRACT

This functions maintains two trees: a fast access tree referring to memory blocks of a size most often requested, and a general access tree referring to memory blocks of a size less often requested. After satisfying a request for a memory block, the function adjusts the trees to ensure that the fast access tree refers to memory blocks of the size most often requested. By providing such functionality, the function improves its performance over time through self-adaptation.

18 Claims, 5 Drawing Sheets

U.S. PATENT DOCUMENTS

| | | | |
|---|---|---|---|
| 5,640,550 A | 6/1997 | Coker | |
| 5,673,387 A | 9/1997 | Chen et al. | 714/38 |
| 5,675,790 A | 10/1997 | Walls | 707/205 |
| 5,675,802 A | 10/1997 | Allen et al. | 717/103 |
| 5,689,712 A | 11/1997 | Heisch | 717/130 |
| 5,696,937 A | 12/1997 | White et al. | 711/142 |
| 5,710,727 A | 1/1998 | Mitchell et al. | 702/128 |
| 5,724,262 A | 3/1998 | Ghahramani | 702/186 |
| 5,734,822 A | 3/1998 | Houha et al. | |
| 5,737,605 A | 4/1998 | Cunningham et al. | 719/312 |
| 5,740,431 A | 4/1998 | Rail | |
| 5,740,433 A | 4/1998 | Carr et al. | |
| 5,742,793 A | 4/1998 | Sturges et al. | 711/152 |
| 5,745,897 A | 4/1998 | Perkins et al. | 707/101 |
| 5,748,892 A | 5/1998 | Richardson | 709/200 |
| 5,748,961 A | 5/1998 | Hanna et al. | 717/145 |
| 5,754,820 A | 5/1998 | Yamagami | |
| 5,761,426 A | 6/1998 | Ishizaki et al. | 709/221 |
| 5,774,724 A | 6/1998 | Heisch | 717/129 |
| 5,784,698 A | 7/1998 | Brady et al. | 711/171 |
| 5,787,480 A | 7/1998 | Scales et al. | 711/148 |
| 5,805,795 A | 9/1998 | Whitten | 714/38 |
| 5,812,799 A | 9/1998 | Zuravleff et al. | 710/52 |
| 5,835,705 A | 11/1998 | Larsen et al. | 714/47 |
| 5,850,554 A | 12/1998 | Carver | 717/162 |
| 5,860,024 A | 1/1999 | Kyle et al. | 710/6 |
| 5,864,867 A | 1/1999 | Krusche et al. | 707/104.1 |
| 5,867,649 A | 2/1999 | Larson | 709/201 |
| 5,867,735 A | 2/1999 | Zuravleff et al. | 710/52 |
| 5,872,977 A | 2/1999 | Thompson | 717/122 |
| 5,890,171 A | 3/1999 | Blumer et al. | |
| 5,905,488 A | 5/1999 | Demers et al. | 345/173 |
| 5,905,856 A | 5/1999 | Ottensooser | 714/38 |
| 5,913,223 A | 6/1999 | Sheppard et al. | 711/118 |
| 5,920,895 A | 7/1999 | Perazzoli, Jr. et al. | 711/163 |
| 5,963,975 A | 10/1999 | Boyle et al. | 711/147 |
| 5,968,114 A | 10/1999 | Wentka et al. | 718/100 |
| 5,970,510 A | 10/1999 | Sher et al. | 711/149 |
| 5,974,510 A | 10/1999 | Cheng et al. | |
| 5,974,536 A | 10/1999 | Richardson | 712/215 |
| 5,978,892 A | 11/1999 | Noel et al. | 711/170 |
| 5,987,479 A | 11/1999 | Oliver | |
| 5,991,708 A | 11/1999 | Levine et al. | 702/186 |
| 5,991,893 A | 11/1999 | Snider | 714/4 |
| 6,006,031 A | 12/1999 | Andrews et al. | 717/137 |
| 6,009,514 A | 12/1999 | Henzinger et al. | 712/236 |
| 6,014,517 A | 1/2000 | Shagam et al. | 717/142 |
| 6,016,474 A | 1/2000 | Kim et al. | 717/125 |
| 6,018,793 A | 1/2000 | Rao | 711/130 |
| 6,023,583 A | 2/2000 | Honda | 717/158 |
| 6,044,438 A | 3/2000 | Olnowich | 711/130 |
| 6,049,798 A | 4/2000 | Bishop et al. | 707/10 |
| 6,049,855 A | 4/2000 | Jeddeloh | |
| 6,052,708 A | 4/2000 | Flynn et al. | 709/108 |
| 6,052,763 A | 4/2000 | Maruyama | |
| 6,055,368 A | 4/2000 | Kunioka | 703/13 |
| 6,065,019 A | 5/2000 | Ault et al. | 707/206 |
| 6,066,181 A | 5/2000 | DeMaster | 717/148 |
| 6,072,951 A | 6/2000 | Donovan et al. | |
| 6,077,312 A | 6/2000 | Bates et al. | 717/129 |
| 6,081,868 A | 6/2000 | Brooks | 711/3 |
| 6,085,029 A | 7/2000 | Kolawa et al. | 714/38 |
| 6,088,771 A | 7/2000 | Steely, Jr. et al. | |
| 6,098,169 A | 8/2000 | Ranganathan | 712/227 |
| 6,101,325 A | 8/2000 | Flaat | 717/136 |
| 6,101,525 A | 8/2000 | Hecker | 709/104 |
| 6,108,343 A | 8/2000 | Cruickshank et al. | |
| 6,119,198 A | 9/2000 | Fromm | 711/5 |
| 6,125,430 A | 9/2000 | Noel et al. | 711/152 |
| 6,141,692 A | 10/2000 | Loewenstein et al. | 709/234 |
| 6,145,054 A | 11/2000 | Mehrotra et al. | 711/119 |
| 6,167,565 A | 12/2000 | Kanamori | 717/146 |
| 6,173,327 B1 | 1/2001 | De Borst et al. | 709/231 |
| 6,173,368 B1 | 1/2001 | Kreuger et al. | |
| 6,205,537 B1 | 3/2001 | Albonesi | 712/13 |
| 6,223,134 B1 | 4/2001 | Rust et al. | 702/121 |
| 6,253,252 B1 | 6/2001 | Schofield | 709/315 |
| 6,263,485 B1 | 7/2001 | Schofield | 717/114 |
| 6,269,457 B1 | 7/2001 | Lane | 714/38 |
| 6,282,702 B1 | 8/2001 | Ungar | 717/148 |
| 6,286,130 B1 | 9/2001 | Poulsen et al. | 717/119 |
| 6,295,600 B1 | 9/2001 | Parady | 712/228 |
| 6,304,951 B1 | 10/2001 | Mealey et al. | 711/206 |
| 6,311,320 B1 | 10/2001 | Jibbe | 717/111 |
| 6,314,429 B1 | 11/2001 | Simser | 707/103 |
| 6,317,871 B1 | 11/2001 | Andrews et al. | 717/137 |
| 6,341,338 B1 | 1/2002 | Dennie | |
| 6,351,845 B1 | 2/2002 | Hinker et al. | 717/128 |
| 6,353,829 B1 | 3/2002 | Koblenz et al. | 707/100 |
| 6,353,869 B1 | 3/2002 | Ofer et al. | |
| 6,366,994 B1 | 4/2002 | Kalyur | |
| 6,369,725 B1 | 4/2002 | Busaba | 341/84 |
| 6,430,657 B1 | 8/2002 | Mittal et al. | |
| 6,434,714 B1 | 8/2002 | Lewis et al. | |
| 6,438,745 B1 | 8/2002 | Kanamaru et al. | 717/137 |
| 6,442,162 B1 | 8/2002 | O'Neill et al. | 370/389 |
| 6,473,833 B1 | 10/2002 | Arimilli et al. | |
| 6,480,818 B1 | 11/2002 | Alverson et al. | 703/26 |
| 6,496,902 B1 | 12/2002 | Faanes et al. | 711/118 |
| 6,502,136 B1 | 12/2002 | Higuchi et al. | |
| 6,523,090 B1 | 2/2003 | Tremblay | 711/125 |
| 6,542,919 B1 | 4/2003 | Wendorf et al. | 718/100 |
| 6,574,725 B1 | 6/2003 | Kranich et al. | |
| 6,629,214 B1 | 9/2003 | Arimilli et al. | |
| 6,647,546 B1 | 11/2003 | Hinker et al. | |
| 6,684,296 B1 | 1/2004 | Hayter et al. | |
| 2001/0003831 A1 | 6/2001 | Boland | |
| 2001/0051974 A1 | 12/2001 | Saad | 707/1 |
| 2002/0046201 A1 | 4/2002 | Hembry | 707/1 |
| 2002/0073360 A1 | 6/2002 | Lewis et al. | |
| 2002/0078010 A1 | 6/2002 | Ehrman et al. | 707/1 |
| 2003/0061395 A1 | 3/2003 | Kingsbury et al. | 709/312 |

FOREIGN PATENT DOCUMENTS

| | | |
|---|---|---|
| EP | 0 390 339 A2 | 10/1990 |
| EP | 0 703 534 A1 | 3/1996 |
| EP | 0 817 044 A2 | 1/1998 |
| EP | 0 965 921 A2 | 12/1999 |
| EP | 1 024 432 A | 8/2000 |
| EP | 1 026 592 A2 | 8/2000 |
| EP | 1 081 585 A1 | 3/2001 |
| FR | 2 793 908 A1 | 11/2000 |
| GB | 2 324 942 A | 11/1998 |
| GB | 2 343 029 | 4/2000 |
| GB | 2 357 873 | 7/2001 |
| JP | 03-282731 A | 12/1991 |
| JP | 07-056716 A | 3/1995 |
| JP | 07-156716 A1 | 3/1995 |
| WO | WO 99/10812 A1 | 3/1999 |

OTHER PUBLICATIONS

Article "Caching Objects In A Data Space," *IBM Technical Disclosure Bulletin*, IBM Corp., vol. 37, No. 10, Oct., 1994, pp. 587-590.

"Algorithm Visualization System: Introduction," available online at: www.cp/eng.chula.ac.th/faculty/spj/research/avis/intro.html as of Jun. 10, 1999, 2 pages.

"GeoMAMOS Project Home Page," available online at: www.ece.nwu.edu/~theory/geomamos.html as of Jun. 10, 1999, 4 pages.

"Introduction," available online at: www.ece.edu/~theory/gs_tech_1_html/section 3_1.html as of Jun. 10, 1999, 3 pages.

"Pentium Processor Family User Manual vol. 3: Architecture and Programming Manual," pp. 25-182, 25-183, 25-309, and 25-310, Intel Corp., (1994).

"Purify for Windows NT, Product Overview," Ver. 6.0, available online at: www.rational.com/products/purify_nt/prodinfo/index.jtmpl as of Jan. 11, 1999, 3 pages.

"Scientific Simulations and Algorithm Visualizations Using NESL and Java," available online at: www.cs.cmu.edu/~scandal/applets/ as of Jun. 10, 1999, 1 page.

"Visualization for Developing Geometric Algorithms," available online at: www.ece.nwu.edu/~theory/gs_tech_1_html/section3_3.html as of Jun. 10, 1999, 2 pages.

Attali et al., "Semantic-Based Visualization for Parallel Object-Oriented Programming," Proceedings of the 11th Annual Conference on Object Oriented Programing Systems, 1996, pp. 421-440.

Barry Wilkinson et al., "Parallel Programming," Prentice Hall, 1999.

Conradi et al., "Version Models for Software Configuration Management," ACM Computing Surveys, vol. 30, No. 2, Jun. 1998, pp. 232-282.

David E. Culler et al., "Parallel Computer Architecture", Morgan Kaufman Publishers, Inc., San Francisco, California, 1999.

Ian Foster, "Designing and Building Parallel Programs", Addison-Wesley Publishing Company, 1995.

Kevin Dowd and Charles R. Severance, "High Performance Computing," Second Edition, Chapter 10, Shared Memory Multiprocessors, Aug. 1998, pp. 216-218.

Sun Microsystems Computer Company, "Prism 5.0 Reference Manual," Revision A., Nov. 1997.

Sun Microsystems, "UltraSPARC User's Manual," UltraSPARC-1, UltraSPARC-II, Jul. 1997, pp. 319-325.

Wasserman et al., "A Graphical, Extensible Integrated Environment for Software Development," Proceedings of the ACD SIGSOFT/SIGPLAN Software Engineering Symposium on Practical Software Development Environments, 1986, pp. 131-142.

Broberg et al., "Visualization and Performance Prediction of Multithreaded Solaris Programs by Tracing Kernel Threads", Department of Software Engineering and Computer Science, University of Karlskrona/Ronneby, Sweden, 7 pages.

Haggander et al., "Optimizing Dynamic Memory Manager in a Multithreaded Application Executing on a Multiprocessor," International Conference on Parallel Processing, Minneopolis, MN, Aug. 10-14, 1998, pp. 262-269.

Larson et al., "Memory Allocation for Long-Running Server Applications," ISMM 1998, International Symposium on Memory Management, Vancouver, BC, Canada, Oct. 17-19, 1998, vol. 34, No. 3, pp. 176-185.

Nathan P. Kropp, Philip J. Koopman, Daniel P. Siewiorek, "Automated Robustness Testing of Off-the-Shelf Software Components," Institute for Complex Engineered Systems, Carnegie Mellon University, Pittsburgh, PA, pp. 230-239, IEEE (1998).

Valvano, "Debugging Strategies," Chapter 6, pp. 6.1-6.10, Real Time Debugging, Online Manual, Jun. 7, 1999, Retrieved from the Internet: <URL:http://www.ece.utexas.edu/{valvano/EE360P/PDF/Ch6.pdf>.

"dcpid—DIGITAL Continuous Profiling Infrastructure daemon", Man pages for SCR-Installed Programs (Alpha/NT), Online <URL:http://research.compaq.com/SRC/dcpi/html/ntalpha/dcpi.html>, 1997, pp. 1-6.

Browne et al., "PAPI: Portable Interface to Hardware Performance Counters," Cewes Major Shared Resources Center Pet Technical Reports, vol. 99-06, 1999, Online, <URL:http://www.wes.hpc.mil/pet/tech_reports/reports/pdf/tr_9906.pdf>, pp. 3-13.

IBM Technical Disclosure Bulletin, "Internal Performance Measurement Counters," IBM Corp., vol. 34, No. 4A, Sep. 1991, pp. 51-52 (the whole document).

IBM Technical Disclosure Bulletin, "Simultaneous Viewing of Performance Monitor Data Independent of Counters," IBM Corp., vol. 39, No. 10, Oct. 1996, pp. 181-183.

Zagha et al., "Performance Analysis Using the MIPS R10000 Performance Counters", SC96 Technical Papers, Online, <URL:http://www.supercomp.org/sc96/proceedings/SC96PROC/ZAGHA/INDEX.HTM>, Nov. 1996, pp. 1-22.

Metcalf, Michael, "CERN," Geneva 1991, 1997 pp. 1-27, ftp://ftp>numerical.rl.ac.uk/pub/MandR/convert.f90.

Handy, Jim, "The Cache Memory Book", Second Edition, 1998, pp. 55, 66, 67, 155.

IBM Technical Disclosure Bulletin, "Caching Objects in a Data Space," Oct. 1, 1994, vol. No. 37, pp. 587-590.

"Code Complete: A Practical Handbook of Software Construction," Steve McConnell, Chapter 19-Self-Documenting Code, http://library.books24X7.com/book/id 2835/viewer.asp?pr=1, 1993, Microsoft Press, pp. 1-16.

Buckley, A., "Conversion to Fortran 90: A Case Study," ACM Transactions on Mathematical Software, 1994, pp. 308-353.

Purtilo, J. et al., "Module Reuse by Interface Adaption", Software—Practice and Experience, 1991, pp. 539-556.

"Visual Basic 5.0 Introduction," Windows 95 Student Manual, 1997, pp. V-VI; 1-278.

Cantrill, B.M. et al., "ThreadMon: A Tool for Monitoring Multithreaded Program Performance," System Sciences, pp. 253-265.

Grundy, J.C., et al., "Supporting Flexible Consistency Management Via Discrete Change Description Propagation," Software Practice & Experience, John Wiley & Sons Ltd., vol. 26, Sep. 1996 No. 9, pp. 1053-1083.

Karavanic K.L. et al., "Integrated Visualization of Parallel Program Performance Data," vol. 23, 1997, pp. 181-198.

Purtilo, J., et al., "Module Reuse by Interface Adaptation," Software—Practice and Experience, Jun. 1991, pp. 539-556.

Xu, Miller & Naim, "Dynamic Instrumentation of Threaded Application," Internet Article, Online,URL:ftp://ftp.cs.wisc.edu/paradyn/technical_papers/threads.pdf Oct. 29, 1998, pp. 1-17.

Cooper, Keith D., et al., "An Experiment with Inline Substitution," *Software- Practice and Experience*, vol. 21, No. 6, Jun. 1991, pp. 581-601.

Holland, Angela, et al., "A Compiler for Selective Procedure Inlining," *ACM 31st Annual Southeast Conference*, 1993, pp. 207-212.

\* cited by examiner

ADAPTIVE MEMORY ALLOCATION

FIELD OF THE INVENTION

This invention relates generally to data processing systems, and more particularly, to methods for optimizing the allocation and deallocation of shared memory to programs executing in a data processing system.

BACKGROUND OF THE INVENTION

During execution, programs typically make many dynamic memory access requests. Such requests involve requesting allocation of memory from a system call (e.g., malloc), utilizing the memory, and deallocating the memory using a system call (e.g., free). Dynamic memory allocation is a fundamental and very important part of many computer programs. It is therefore desirable to improve the performance of memory access functions.

SUMMARY OF THE INVENTION

In accordance with methods and systems consistent with the present invention, an improved memory access function (e.g., malloc) is provided that dynamically improves its performance by changing its operation at runtime. The memory access function adapts its operation based on previous memory access requests to be able to provide the fastest response to those kinds of memory access requests that it predicts will be the most common. For purposes of this description "access to system memory" includes both requests for allocation of system memory and release of system memory, or deallocation. Similarly, a "memory request" refers to either an allocation (a request for system memory), or a deallocation (a return of previously requested memory).

In accordance with methods and systems consistent with the present invention, as embodied and broadly described herein, a method is provided in a data processing system for allocating memory. The method receives a memory request for a reference to a block of memory. Then it returns the reference to the block of memory to satisfy the request. Next, it adjusts an operation of the memory access function based on the memory request.

Furthermore, in accordance with methods and system consistent with the present invention, as embodied and broadly described herein, a system for providing access to memory includes a memory which further includes a program including a memory access function that provides access to memory and adjusts its operation according to a memory request for a reference to a block of memory, and a processor for executing the program.

DETAILED DESCRIPTION

Methods and systems consistent with the present invention provide a function called "smart-alloc" that adapts in real-time the memory allocation process to threads executing in a data processing system. More specifically, smart-alloc observes past memory allocation behavior and adjusts the process of providing memory access such that the most frequently requested memory blocks of a specific size are allocated faster than less frequently requested memory block sizes. Smart-alloc is a language-independent library function which may be linked to one or more programs operating in a multi-processing environment.

Overview

When a program begins execution, smart-alloc secures access to an amount of memory that may be accessed as needed by threads executing within the program. Upon receiving a pointer from a system memory call to an amount of memory requested, smart-alloc divides the memory into blocks of varying sizes, grouping blocks of like size together in a linked-list, referred to as a free memory linked-list. Smart-alloc creates two trees that point to the free memory linked-lists: a fast access tree and a general access tree. As a program executes, the fast access tree points to the most frequently accessed memory block sizes, and the general access tree points to block sizes not pointed to by the fast access tree. Each free memory linked-list will be pointed to by either the general access tree, or the fast access tree, but not both.

Upon receiving a request from an executing thread for access to memory, smart-alloc increments a counter associated with the block size that will be used to satisfy the memory request. To satisfy the memory request, smart-alloc first determines whether the fast access tree points to memory blocks of the size needed to satisfy the request. If the fast access tree includes memory blocks of the size needed to satisfy the request, smart-alloc satisfies the request from the fast access tree. Otherwise, smart-alloc satisfies the request from the general access tree. If a request is satisfied from the general access tree, smart-alloc compares the value of the counter associated with the allocated block size to the counter values for block sizes included in the fast access tree to determine whether the general access tree refers to block sizes most frequently requested. If the counter value for the allocated block size (from the general access tree) is greater than any of the counter values of block sizes included in the fast access tree, smart-alloc replaces that general access tree pointer to the block size having the highest counter value with a pointer from the fast access tree, and replaces the pointer to the block size included in the fast access tree having the lowest counter value with a pointer from the general access tree. This process ensures that the fast access tree continues to point to the most frequently requested block sizes.

Smart-alloc also receives requests from executing threads desiring to release references to blocks of memory. After receiving a released reference, smart-alloc adds the reference to the free memory linked-list that includes memory blocks corresponding to the size of the returned reference.

Implementation Details

Figure 1:
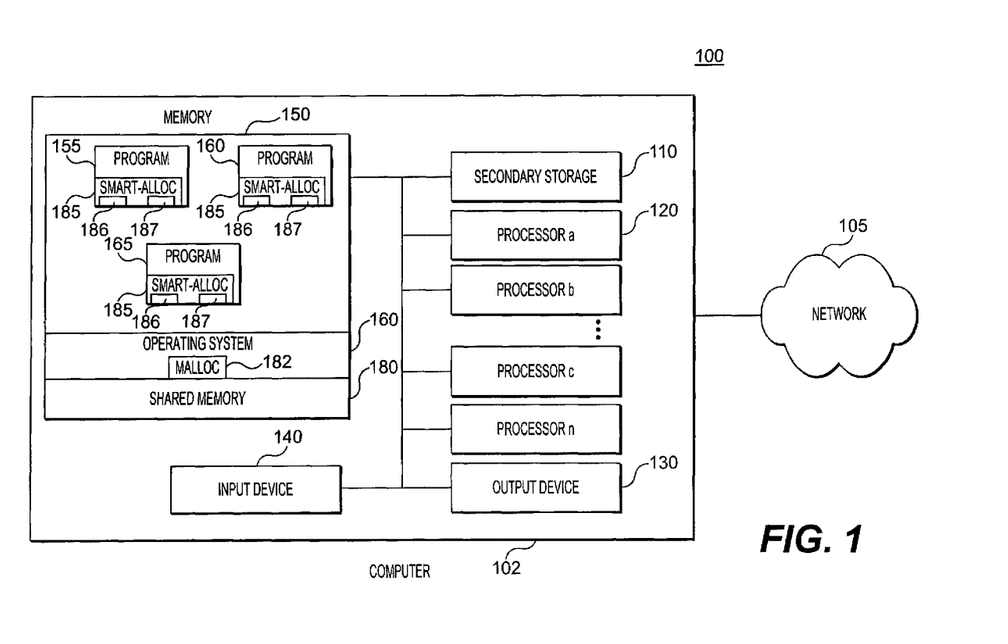
FIG. 1 depicts a block diagram of a data processing system suitable for practicing methods and systems consistent with the present invention.

FIG. 1 depicts a block diagram of a data processing system 100 suitable for practicing methods and implementing systems consistent with the present invention. Data processing system 100 includes computer 102 connected to network 105. Computer 102 includes secondary storage 110, processors 120a . . . n, output device 130, input device 140, and memory 150. Memory 150 includes programs 155, 160, and 165, operating system 170, and shared memory 180. Operating system 170 includes a system shared memory access function, malloc 182. Each of programs 155, 160, and 165 includes smart-alloc 185, a shared memory access function operating in accordance with the principles of the present invention. Each instance of smart-alloc 185 includes two data structures, a fast access tree 186 and a general access tree 187 that are used by smart-alloc 185 when allocating and deallocating memory.

Programs 155, 160, and 165 share access to shared memory 180. Programs 155, 160, and 165 may include a single thread or multiple threads. Although multiple processors are shown, one skilled in the art will appreciate that programs 155, 160, and 165 may execute on a single processor to implement methods and practice systems consistent with the present invention.

Operating system 170 represents the Solaris® operating system from Sun Microsystems, Inc., which specifically facilitates multi-threaded program execution, although any operating system may be used to implement methods and systems consistent with the present invention.

Although aspects of this implementation are depicted as being stored in memory 150, one skilled in the art will appreciate that all or part of systems and methods consistent with the present invention may be stored on or read from other computer readable media, such as secondary storage devices, like hard disks, floppy disks, and CD-ROM; a digital signal received from a network such as the Internet; or other forms of RAM or ROM, either currently known or later developed. Sun, Sun Microsystems, and the Sun logo are trademark or registered trademarks of Sun Microsystems, Inc. in the United States and other countries.

Figure 2:
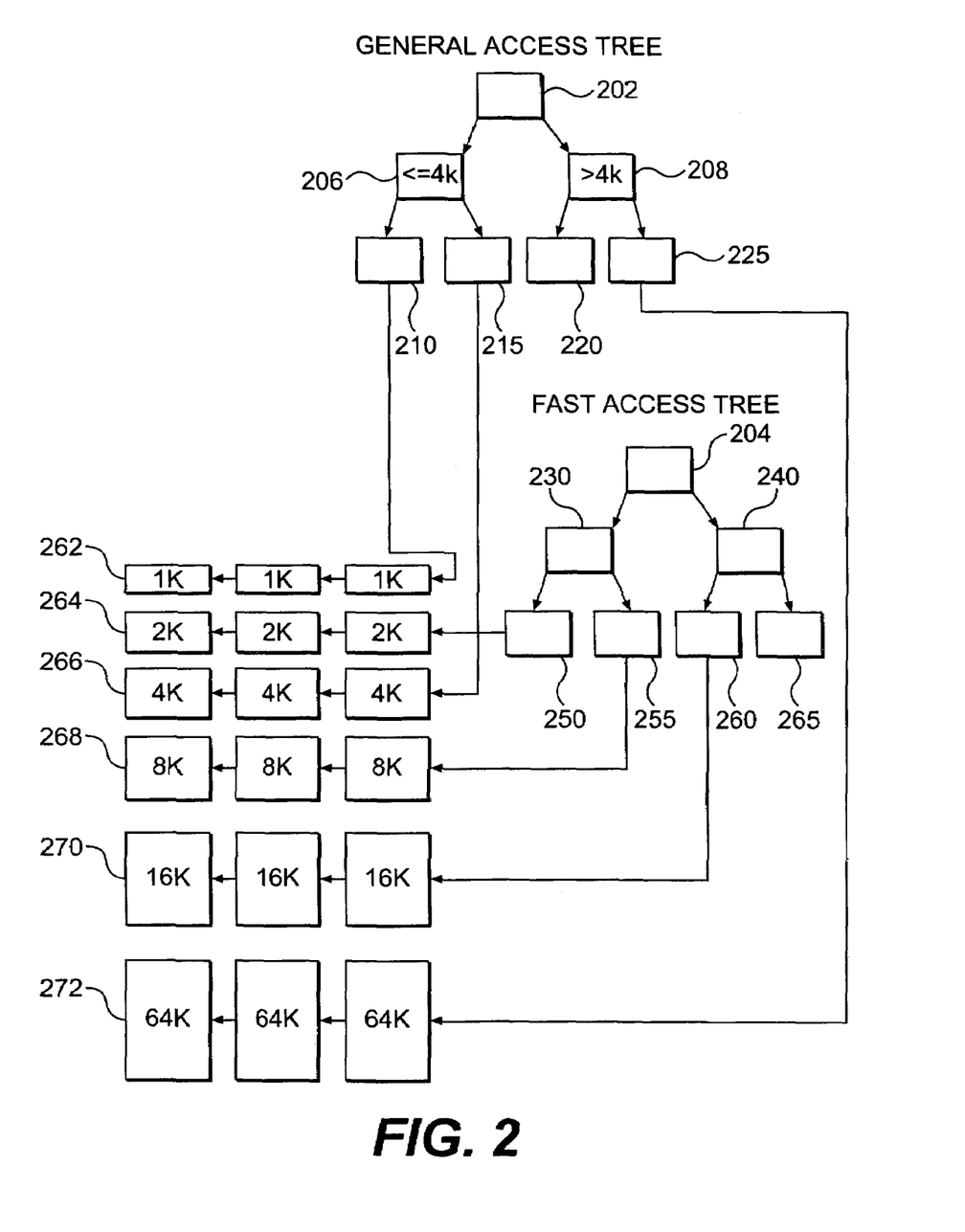
FIG. 2 depicts in greater details the general access tree and the fast access tree depicted in FIG. 1.

FIG. 2 depicts general access tree 202 and fast access tree 204 pointing to free memory linked-lists 262–272. In this example, general access tree 202 includes two main branches: branch 206 including pointers to free memory linked-lists containing references to memory blocks of a size less than or equal to 4K and branch 208 including pointers to free memory linked-lists containing references to memory blocks of a size greater than 4K. Branches 210, 215, and 225 serve as head pointers to free memory linked-lists 262, 266, and 272, which include memory blocks of size 1K, 4K, and 64K, respectively. Fast access tree 204 also includes two main branches, 230 and 240. Fast access tree 204 further includes head pointers 250, 255, and 260 to free memory linked-lists 264, 268, and 270, including memory blocks of size 2K, 8K, and 16K, respectively, indicating that these memory block sizes were most frequently accessed by the threads executing in the associated program. General access tree 202 may include additional branches that include head pointers to additional free memory linked-lists. Fast access tree 204, however, only includes head pointers to a specific number of free memory linked-lists, typically no more than eight. A "head pointer" is a pointer to the beginning of a free memory linked-list. Thus, because the fast access tree does not typically grow as large as the general access tree, accesses to the fast access tree are faster than accesses to the general access tree.

Figure 3A:
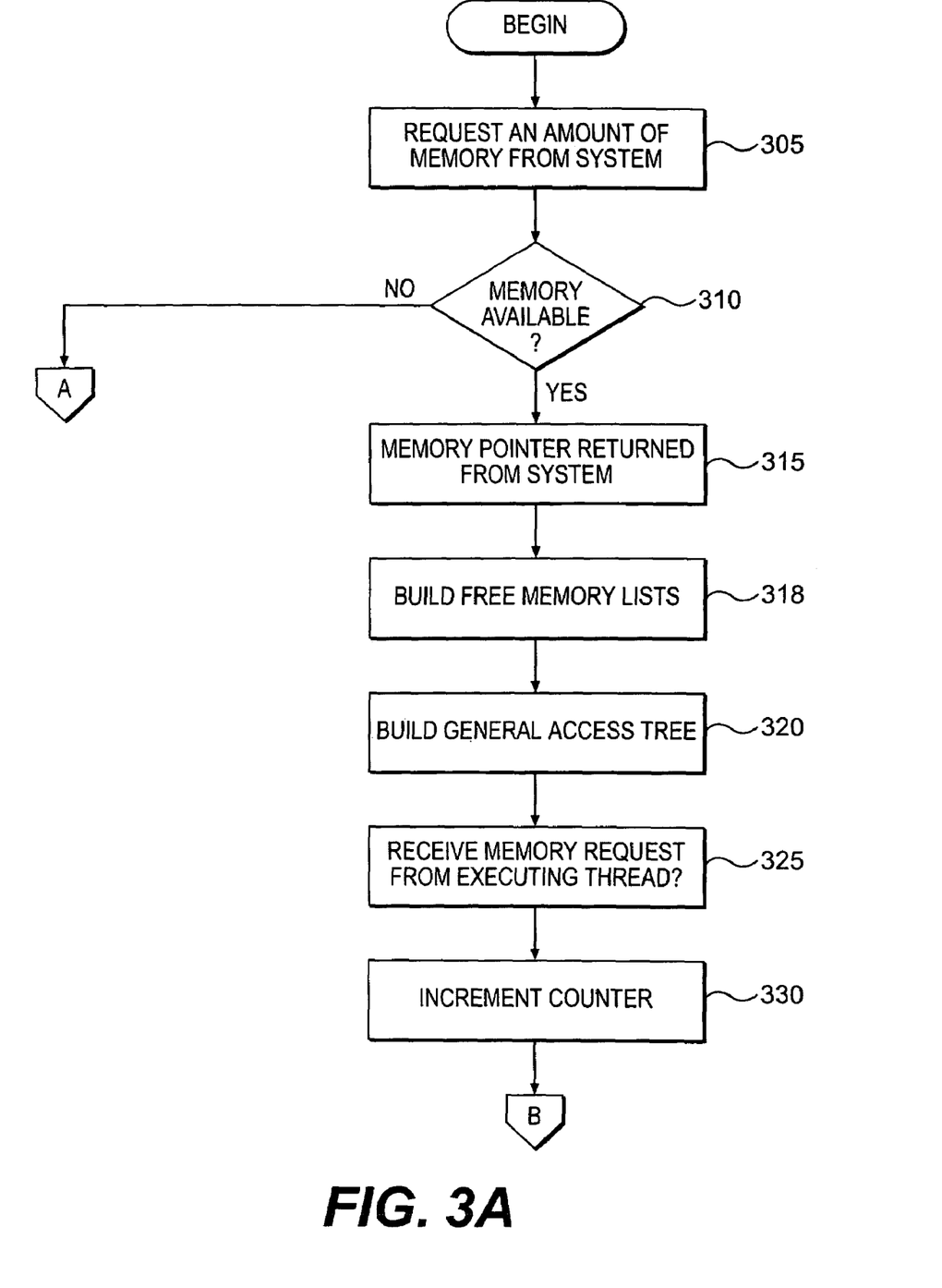
FIGS. 3A & 3B depict a flow diagram illustrating operations performed to allocate memory in accordance with the principles of the present invention.
Figure 3B:
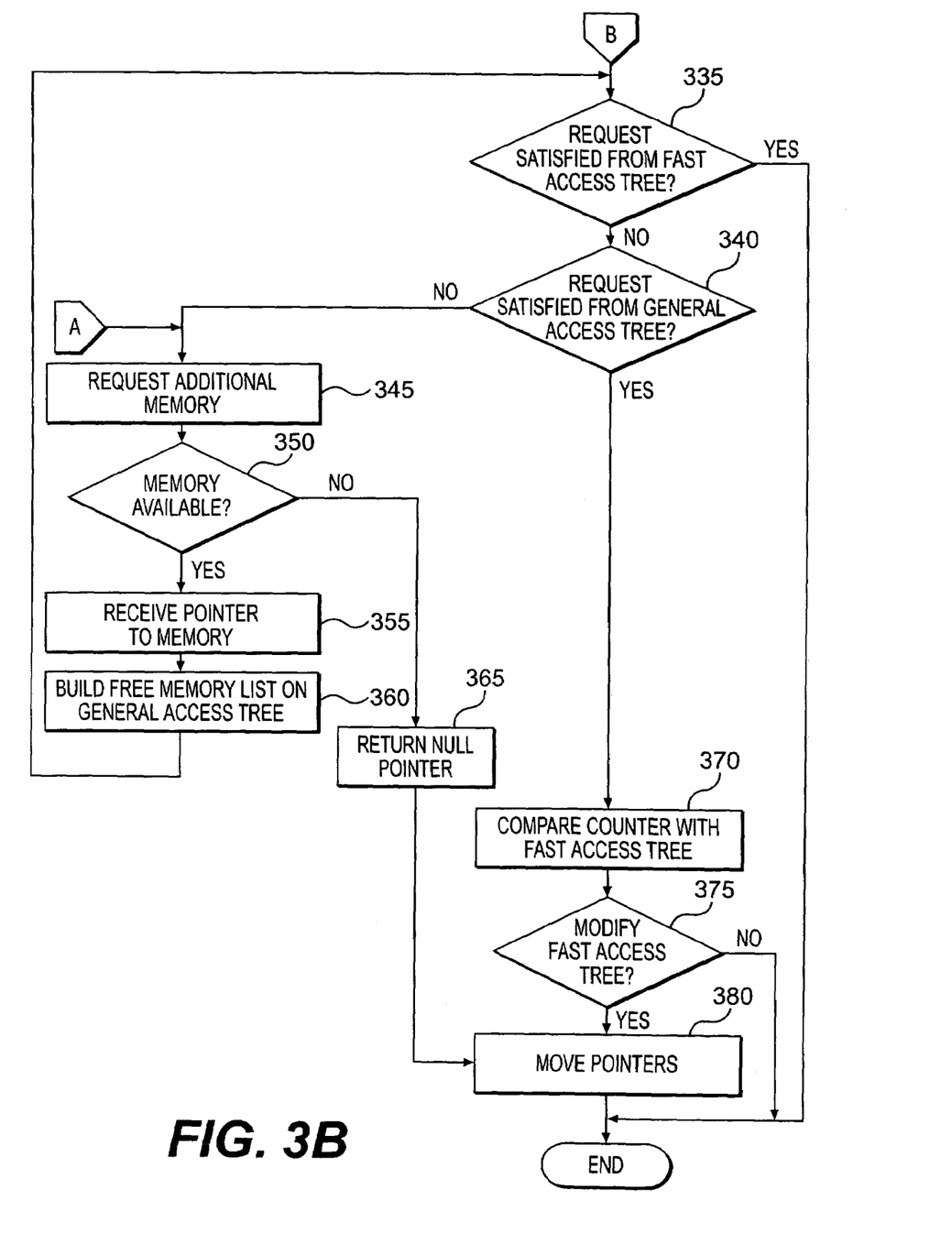

FIGS. 3A & 3B depict a flow diagram of a smart-alloc function operating in accordance with the principles of the present invention. First, smart-alloc requests access to an amount of memory from a system memory call included as part of an operating system (step 305). If the amount of memory is available (step 310), the system memory call returns to smart-alloc a pointer to the amount of memory requested (step 315). Upon receiving a pointer to a requested amount of memory, smart-alloc divides the memory into blocks of varying sizes and builds a free memory linked-list for each block size (step 318). The block sizes in the free memory linked-lists begin at 1K and increase in an amount equal to double the size of a previous block. For example, 1K, 2K, 4K, 8K, 16K, etc. Once the free memory linked-lists are created, smart-alloc creates the general access tree which includes head pointers to each of the free memory linked-lists (step 320). Initially, the fast access tree is empty. As a program executes and a series of memory requests are processed, the fast access tree is populated as discussed below.

Upon receiving a memory request from an executing thread (step 325), smart-alloc increments the value of a counter associated with the block size used to satisfy the request (step 330). Thus, if a thread requests 1026 bytes of memory and the free memory linked-lists include 1K and 2K blocks, a reference to the 2K block will be returned to the requesting thread, and the value of the counter associated with the 2K free memory linked-list will be incremented. If this memory request is satisfied from the fast access tree (step 335), processing ends.

Otherwise, if the memory request is satisfied from the general access tree (step 340), then the counter associated with the block size used to satisfy the request is compared with the counter for block sizes pointed to by the fast access tree (step 370). Smart-alloc then determines whether the block size should be added to the free memory linked-list pointed to by the fast access tree step 375 because it includes memory blocks of a size most often requested by the executing program. In this step, smart-alloc compares the value of the counter associated with a block size included in the general access tree with the value of the counter of a block size included in the fast access tree. If the counter value for the block in the general access tree is greater than the counter value for the block in the fast access tree, the pointer from the general access will be replaced with a pointer from the fast access tree. Additionally, the fast access tree pointer that points to the block size having the lowest counter value is replaced with the pointer from the general access tree (step 380). Changing the pointers in this manner ensures that the fast access tree continually points to the most frequently allocated block sizes, thereby increasing the efficiency of memory allocation. Otherwise, if the counter value associated with the block in the general access tree is not greater than the counter value of any of the free memory linked-lists pointed to by the fast access tree, processing ends.

If a memory request cannot be satisfied from either the general or fast access trees, smart-alloc requests additional memory from a system memory call (step 345). If the additional memory is available (step 350), a pointer to the amount of memory is returned to smart-alloc (step 355), the memory is divided into blocks that are added to the free memory linked-lists pointed to by a pointer from the general access tree (step 360), and processing continues to step 335. Otherwise, if the requested amount of memory is not available, the system memory call returns a null pointer to smart-alloc (step 365), and processing ends.

Figure 4:
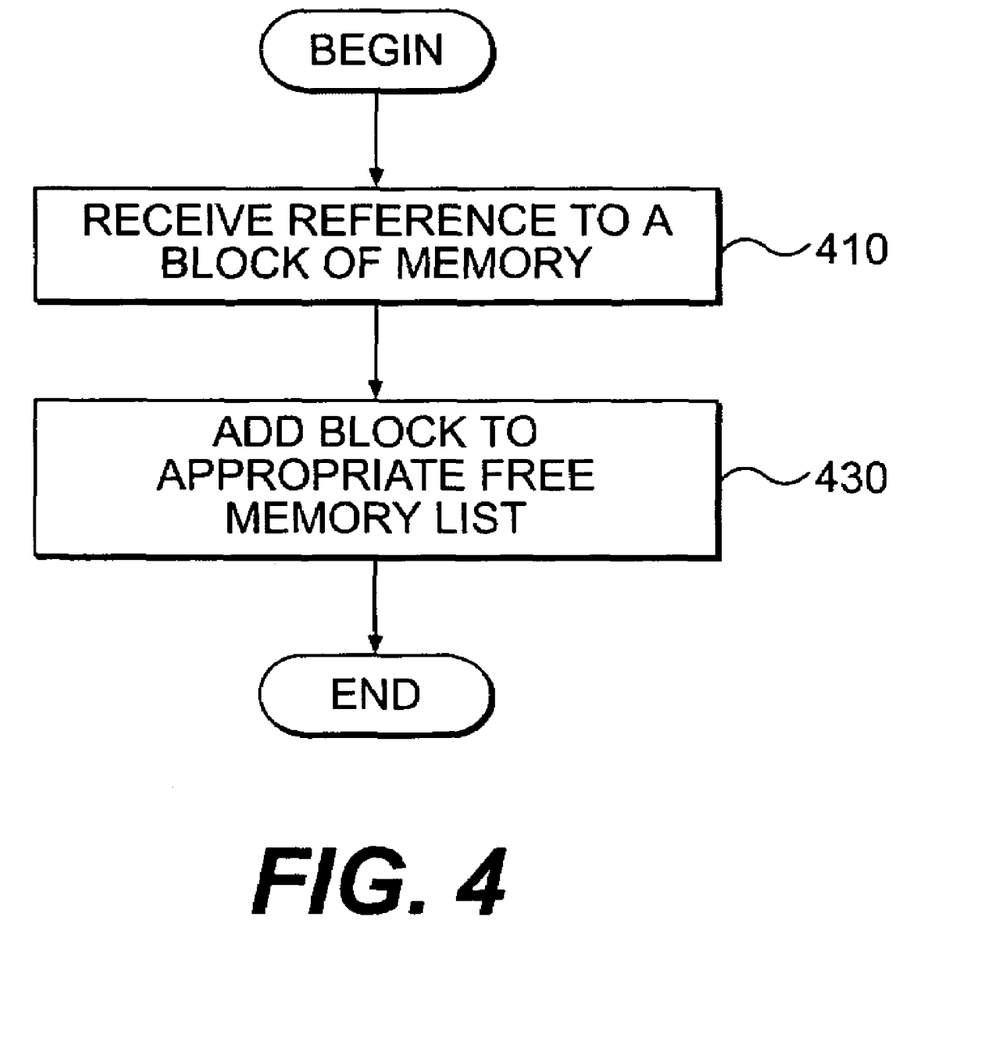
FIG. 4 depicts a flow diagram illustrating operations performed to deallocate memory in accordance with the principles of the present invention.

FIG. 4 depicts a flow diagram of operations performed by smart-alloc when a thread releases a reference to a block of memory. Upon receiving a reference to a block of memory from an executing thread (step 410), smart-alloc adds the reference to the appropriate free memory linked-list (step 430) and processing ends.

CONCLUSION

Methods and systems operating in accordance with the principles of the present invention optimize the process of allocating memory to threads executing in programs operating in a data processing system by adapting the allocation process according to the behavior of an executing program. This smart-alloc function is a library function that may be linked to any program executing in a data processing system. As discussed above, smart-alloc operates in the user space and does not require accessing the operating system each time memory is allocated or deallocated. These distributive and adaptive features of smart-alloc allow it to minimize the number of accesses to the operating system, a costly and time consuming event, and ultimately yields increased system performance.

Methods and systems consistent with the present invention are applicable to all single and multi-threaded programs written in all computer programming languages, including Fortran 77, Fortran 90, Java, C, and C++. Although maximum increases in efficiency will be realized in a multi-processor computing environment, methods and systems consistent with the present invention may also provide operational benefits in a single or multi-threaded, single processor environment.

Although the foregoing description has been described with reference to a specific implementation, those skilled in the art will know of various changes in form and detail which may be made without departing from the spirit and scope of the present invention as defined in the appended claims and the full scope of their equivalents.

What is claimed is:

1. A method in a data processing system for allocating memory by a memory allocation function, comprising:
   receiving a memory request for a reference to a block of memory;
   returning the reference to the block of memory to satisfy the request;
   forming a plurality of linked-lists referring to memory blocks of a plurality of sizes, each of the plurality of linked-lists referring to memory blocks of a common size;
   setting a fast access tree to refer to a first one of the plurality of linked-lists; and
   setting a general access tree to refer to a second one and a third one of the plurality of linked-lists, wherein a size of a memory block referred to by the first linked-list is larger than a size of a memory block referred to by the second linked-list and smaller than a size of a memory block referred to by the third linked-list.

2. The method of claim 1, further comprising adjusting a structure of the fast access tree and the general access tree based on the memory request.

3. The method of claim 2, further comprising searching the fast access tree to satisfy the memory request and, if the memory request is not satisfied, searching the general access tree to satisfy the memory request.

4. The method of claim 1, further including ensuring that the fast access tree refers to one of the plurality of linked-lists that is most frequently requested.

5. The method of claim 1, wherein receiving, returning, forming, and setting are performed in a user space of the memory.

6. A system for allocating memory, comprising:
   means for receiving a memory request for a reference to a block of memory;
   means for returning the reference to the block of memory to satisfy the request; and
   means for forming a plurality of linked-lists referring to memory blocks of a plurality of sizes, each of the plurality of linked-lists referring to memory blocks of a common size;
   means for setting a fast access tree to refer to a first one of the plurality of linked-lists;
   means for setting a general access tree to refer to a second one and a third one of the plurality of linked-lists, wherein a size of a memory block referred to by the first linked-list is larger than a size of a memory block referred to by the second linked-list and smaller than a size of a memory block referred to by the third linked-list.

7. A data processing system for providing access to memory, comprising:
   a memory including:
   an access tree structure comprising a fast access tree and a general access tree;
   a program including a memory access function that provides access to the memory, forms a plurality of linked-lists referring to memory blocks of a plurality of sizes, each of the plurality of linked-lists referring to memory blocks of a common size, sets the fast access tree to refer to a first one of the plurality of linked-lists, and sets the general access tree to refer to a second one and a third one of the plurality of linked-lists, wherein a size of a memory block referred to by the first linked-list is larger than a size of a memory block referred to by the second linked-list and smaller than a size of a memory block referred to by the third linked-list; and
   a processor for executing the program.

8. The data processing system of claim 7, further including an operating system with a system memory function, and wherein the memory access function provides access to the memory by utilizing the system memory function.

9. The data processing system of claim 7, wherein the memory access function adjusts a structure of the fast access tree and the general access tree based on a memory request.

10. The data processing system of claim 7, wherein the fast access tree refers to one of the plurality of linked-lists that is most frequently accessed.

11. The data processing system of claim 7, wherein a most frequently accessed memory block size is included in the fast access tree.

12. The data processing system of claim 7, wherein a least frequently accessed memory block size is included in the general access tree.

13. The data processing system of claim 7, wherein the memory access function searches the fast access tree to satisfy a memory request and, if the memory request is not satisfied, searches the general access tree to satisfy the memory request.

14. The data processing system of claim 13, wherein each of the plurality of linked-lists has an associated counter indicating a number of times that the associated linked-list has been accessed.

15. A computer-readable medium including instructions for performing a method for allocating memory by a memory allocation function, the method comprising:
   receiving a memory request for a reference to a block of memory;

returning the reference to the block of memory to satisfy the request;

forming a plurality of linked-lists referring to memory blocks of a plurality of sizes, each of the plurality of linked-lists referring to memory blocks of a common size;

setting a fast access tree to refer to a first one of the plurality of linked-lists;

setting a general access tree to refer to a second one and a third one of the plurality of linked-lists, wherein a size of a memory block referred to by the first linked-list is larger than a size of a memory block referred to by the second linked-list and smaller than a size of a memory block referred to by the third linked-list.

16. The computer-readable medium, including instructions for performing the method, of claim 15, the method further comprising adjusting a structure of the fast access tree and the general access tree based on the memory request.

17. The computer-readable medium, including instructions for performing the method, of claim 15, the method further comprising searching the fast access tree to satisfy the memory request and, if the memory request is not satisfied, searching the general access tree to satisfy the memory request.

18. The computer-readable medium, including instructions for performing the method, of claim 15, the method further comprising ensuring that the fast access tree refers to one of the plurality of linked-lists that is most frequently requested.

* * * * *

UNITED STATES PATENT AND TRADEMARK OFFICE
CERTIFICATE OF CORRECTION

PATENT NO. : 7,035,989 B1 Page 1 of 1
APPLICATION NO. : 09/504876
DATED : April 25, 2006
INVENTOR(S) : Paul Hinker et al.

It is certified that error appears in the above-identified patent and that said Letters Patent is hereby corrected as shown below:

On the Title page, item (57), line 1, "functions" should read --function--.

Signed and Sealed this

Twenty-fifth Day of July, 2006

JON W. DUDAS
*Director of the United States Patent and Trademark Office*